United States Patent
Shinohara (10) Patent No.: US 9,995,363 B2
(45) Date of Patent: Jun. 12, 2018

(54) LIQUID-SEALED VIBRATION DAMPING DEVICE

(71) Applicant: YAMASHITA RUBBER CO., LTD., Saitama (JP)

(72) Inventor: Yutaka Shinohara, Saitama (JP)

(73) Assignee: YAMASHITA RUBBER CO., LTD., Saitama (JP)

( * ) Notice: Subject to any disclaimer, the term of this patent is extended or adjusted under 35 U.S.C. 154(b) by 56 days.

(21) Appl. No.: 14/777,777

(22) PCT Filed: Mar. 19, 2014

(86) PCT No.: PCT/JP2014/057494
§ 371 (c)(1),
(2) Date: Sep. 17, 2015

(87) PCT Pub. No.: WO2014/156867
PCT Pub. Date: Oct. 2, 2014

(65) Prior Publication Data
US 2016/0290433 A1 Oct. 6, 2016

(30) Foreign Application Priority Data
Mar. 29, 2013 (JP) ................................ 2013-073243

(51) Int. Cl.
*F16F 13/14* (2006.01)
*B60G 7/00* (2006.01)

(52) U.S. Cl.
CPC .......... *F16F 13/1463* (2013.01); *B60G 7/008* (2013.01); *B60G 2204/143* (2013.01); *B60G 2204/4106* (2013.01)

(58) Field of Classification Search
CPC ...... F16F 13/14; F16F 13/1463; B60G 7/008; B60G 2204/143; B60G 2204/4106
(Continued)

(56) References Cited

U.S. PATENT DOCUMENTS 4,971,299 A * 11/1990 Doi .................... F16F 13/30
267/140.12
5,035,407 A * 7/1991 Takeguchi .......... F16F 13/1427
267/140.12
(Continued)

FOREIGN PATENT DOCUMENTS

CN 1683806 A 10/2005
CN 102996701 A 3/2013
(Continued)

OTHER PUBLICATIONS

International Search Report and Written Opinion dated Jun. 24, 2014 corresponding to International Patent Application No. PCT/JP2014/057494 and English translation thereof.
(Continued)

*Primary Examiner* — Thomas W Irvin
(74) *Attorney, Agent, or Firm* — Squire Patton Boggs (US) LLP (57) ABSTRACT

A pair of fluid chambers in which incompressible fluid is sealed and a pair of orifice-forming members that allows one fluid chamber to communicate with the other fluid chamber are arranged between an inner cylinder and an outer cylinder. The orifice-forming member has a longitudinal groove that communicates with respective fluid chambers, an orifice channel, and a liquid storage section that allows the longitudinal groove to communicate with the orifice channel. The liquid storage section is formed wider and deeper than the orifice channel.

12 Claims, 8 Drawing Sheets

(58) Field of Classification Search
USPC .................................. 267/140.11, 140.12
See application file for complete search history.

(56) References Cited

U.S. PATENT DOCUMENTS

| | | | | |
|---|---|---|---|---|
| 5,199,691 A * | 4/1993 | Bouhier | .................. | F16F 13/14 267/140.12 |
| 5,344,126 A * | 9/1994 | Ishiyama | ................ | F16F 13/14 267/140.12 |
| 5,397,112 A * | 3/1995 | Roth | ..................... | F16F 13/14 267/140.12 |
| 5,496,018 A * | 3/1996 | McLelland | ............. | F16F 13/14 267/140.12 |
| 5,595,373 A * | 1/1997 | Ikeda | ..................... | F16F 13/14 267/140.12 |
| 5,690,320 A * | 11/1997 | Kanda | ..................... | F16F 13/16 267/140.12 |
| 5,702,094 A * | 12/1997 | McLelland | ............. | F16F 13/14 267/140.12 |
| 6,349,926 B1 * | 2/2002 | Itoh | ........................ | F16F 13/14 248/552 |
| 6,557,836 B2 * | 5/2003 | Itoh | ........................ | F16F 13/16 267/140.11 |
| 6,698,731 B2 * | 3/2004 | Thornhill | ............ | F16F 13/1427 267/140.12 |
| 7,219,882 B2 * | 5/2007 | Kato | .................. | F16F 13/1463 267/140.12 |
| 7,275,738 B2 * | 10/2007 | Minamisawa | ...... | F16F 13/1418 267/140.12 |
| 7,845,624 B2 * | 12/2010 | Endo | .................. | F16F 13/1445 267/140.12 |
| 7,866,639 B2 * | 1/2011 | Endo | ....................... | F16F 13/14 267/140.12 |
| 8,038,132 B2 * | 10/2011 | Thornhill | ........... | F16F 13/1463 267/140.12 |
| 8,087,647 B2 * | 1/2012 | Endo | .................. | F16F 13/1409 267/140.12 |
| 8,777,192 B2 * | 7/2014 | Kim | ....................... | F16F 13/14 267/140.12 |
| 9,279,473 B2 * | 3/2016 | Matsushita | ......... | F16F 13/1409 |
| 2001/0052663 A1 * | 12/2001 | Katagiri | ............. | F16F 13/1463 267/140.11 |
| 2005/0230889 A1 | 10/2005 | Minamisawa | | |
| 2006/0119025 A1 | 6/2006 | Kato et al. | | |
| 2009/0189323 A1 * | 7/2009 | Endo | .................. | F16F 13/1409 267/140.12 |
| 2013/0062822 A1 | 3/2013 | Matsushita | | |
| 2017/0074347 A1 * | 3/2017 | Shinohara | ............. | B60G 15/06 |

FOREIGN PATENT DOCUMENTS

| | | |
|---|---|---|
| EP | 1234567 | 8/2016 |
| JP | H07293633 A | 11/1995 |
| JP | 2005-163840 A | 6/2005 |
| JP | 2006-097788 A | 4/2006 |
| JP | 2007-147065 A | 6/2007 |

OTHER PUBLICATIONS

Chinese Office Action application No. 201480018592.8 dated Jul. 19, 2016.

* cited by examiner

LIQUID-SEALED VIBRATION DAMPING DEVICE

TECHNICAL FIELD

The present invention relates to a liquid-sealed vibration damping or attenuation device including an inner cylinder and an intermediate sleeve elastically coupled by a main rubber elastic body.

BACKGROUND ART

For example, Patent Document 1 discloses a liquid-sealed vibration prevention device including a first liquid chamber and a second liquid chamber, whose chamber walls are of a vibration prevention base body, between an inner cylinder and an outer cylinder. Incompressible fluid is sealed in the first liquid chamber and the second liquid chamber, respectively. The first liquid chamber is arranged to communicate with the second liquid chamber via an orifice. Further, an intermediate cylinder arranged between the inner cylinder and the outer cylinder is formed by fitting peripheral walls at both ends and a joining wall therebetween. An end wall made of rubber-like elastic body couples the fitting peripheral walls with the inner cylinder.

In the liquid-sealed vibration prevention device disclosed in Patent document 1, when a load is applied in a direction perpendicular to an axis of the device, the end wall resiliently deforms inward in the liquid chamber for compression, which allows volume to change largely in the liquid chamber for compression so as to enhance liquid fluidization action in the orifice.

PRIOR ART DOCUMENT

Patent Document

Patent document 1: Japanese Patent Application Publication No. 2007-147065

SUMMARY OF THE INVENTION

Problem to be Solved by the Invention

The liquid-sealed vibration damping or attenuation device is desired to have reduced weight while resonance property is maintained. However, if the device is reduced in weight excessively, for example, channel length and the like of the orifice may be changed to affect the resonance property.

A general objective of the present invention is to provide a liquid-sealed vibration damping or attenuation device that can reduce an orifice-forming member in weight without a large impact on resonance property.

Means for Solving the Problem

To achieve the above objective, the present invention includes: an inner cylinder; an intermediate sleeve that is arranged at an outer side of the inner cylinder; a main rubber elastic body that is interposed between the inner cylinder and the intermediate sleeve to elastically couple the inner cylinder with the intermediate sleeve; and an outer cylinder that is arranged at an outer side of the intermediate sleeve; wherein a pair of fluid chambers sealed with incompressible fluid and an orifice-forming member that allows one fluid chamber to communicate with the other fluid chamber are arranged between the inner cylinder and the outer cylinder, wherein the orifice-forming member includes an opening that communicates with respective fluid chambers, an orifice channel and a liquid storage section in which the incompressible fluid is stored, and the liquid storage section is formed deeper than the orifice channel.

In the present invention, material of the orifice-forming member can be reduced by volume of the liquid storage section, thereby allowing the orifice-forming member to be reduced in weight. It should be noted that, since the liquid storage section is formed in a manner such that a depth thereof is deeper than that of the orifice channel, the liquid storage section does not function as an orifice. Consequently, the orifice-forming member can be reduced in weight without significantly affecting the resonance property even if the liquid storage section is formed.

Also, a thickness can be thinner at a portion of the liquid storage section in the orifice-forming member than the conventional one. Thus, for example, if the orifice-forming member is formed with resin material, voids (shrinkage cavities) can hardly occur to improve moldability.

If the opening communicates with the orifice channel via the liquid storage section, an opening width of the liquid storage section may preferably be formed larger than a channel width of the orifice channel. In this way, since the liquid storage section is positioned between the opening and the orifice channel to have a larger channel area than that of the orifice channel, the liquid storage section does not function as an orifice. Consequently, the orifice-forming member can be reduced in weight without significantly affecting the resonance property even if the liquid storage section is formed.

Further, the liquid storage section may be a recess that is concave toward the inner cylinder and a bottom wall of the recess may be formed to have an arc face or a flat face. In this way, the orifice-forming member can be reduced in weight as well as can be produced easily.

Still further, the orifice channel may communicate with the opening as well as the liquid storage section. In this way, the liquid storage section may be formed to communicate with the orifice channel and may not be required to communicate with both the orifice channel and the opening, thereby improving flexibility in layout. In addition, since the incompressible fluid is introduced to the liquid storage section via the orifice channel, the incompressible fluid can be stored easily.

Yet further, the liquid storage section may include a single or a plurality of recesses that is/are concave toward the inner cylinder and the recess/recesses may be positioned toward the inner side with respect to the orifice channel. In this way, the incompressible fluid flowing through the orifice channel can be readily introduced to the recess/recesses positioned at the inner side of the orifice channel.

Furthermore, the liquid storage section may include a plurality of recesses that are concave toward the inner cylinder, the recesses may be arranged along the axial direction of the inner cylinder at one side and the other side of the orifice channel, and communication channels may be formed that allow the recesses to communicate with the orifice channel. In this way, the recesses can be arranged at spaces on both sides of the orifice channel. Thus, the space can be used effectively and the orifice channel can communicate with the recesses easily via the communication channel.

Moreover, the orifice-forming members may include a pair of orifice-forming members and the pair of members may be respectively formed to have the same shape. In this way, the orifice-forming member can be easily produced, and erroneous assembling can be prevented at assembly operation.

Effect of the Invention

The present invention can provide a liquid-sealed vibration damping or attenuation device that can reduce an orifice-forming member in weight without affecting resonance property significantly.

EMBODIMENTS FOR CARRYING OUT THE INVENTION

Figure 1:
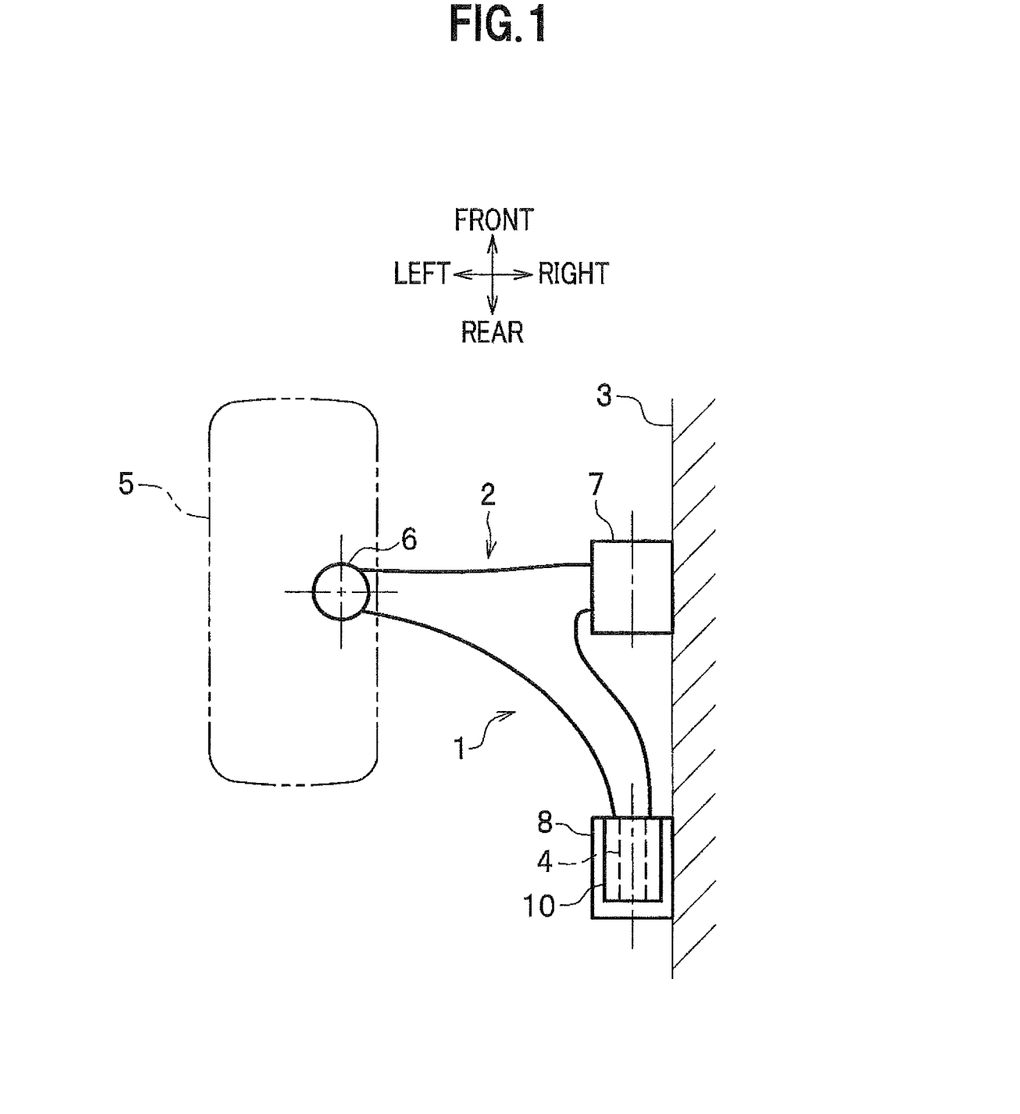
FIG. 1 is a schematic plan view in which a liquid-sealed vibration damping or attenuation device according to an embodiment of the present invention is applied to a suspension of a vehicle.

Next, embodiments of the present invention will be described in detail with reference to the accompanying drawings as appropriate. A liquid-sealed vibration damping or attenuation device 10 according to the embodiments of the present invention includes, as shown in FIG. 1, a bush that couples a lower arm 2 constituting a suspension 1 for a left rear wheel of a car with a vehicle body frame 3 to pivotally support a shaft part 4 of the lower arm 2. It should be noted that, in FIG. 1, reference numeral 5 indicates a tire, reference numeral 6 indicates a ball joint, and reference numerals 7 and 8 indicate support members on the vehicle body, respectively. Further, an up-down direction in the present embodiment is not intended to match a mounted state of the liquid-sealed vibration prevention device 10 on the suspension 1 as shown in FIG. 1, but is intended to match an up-down direction in FIG. 1.

Figure 2:
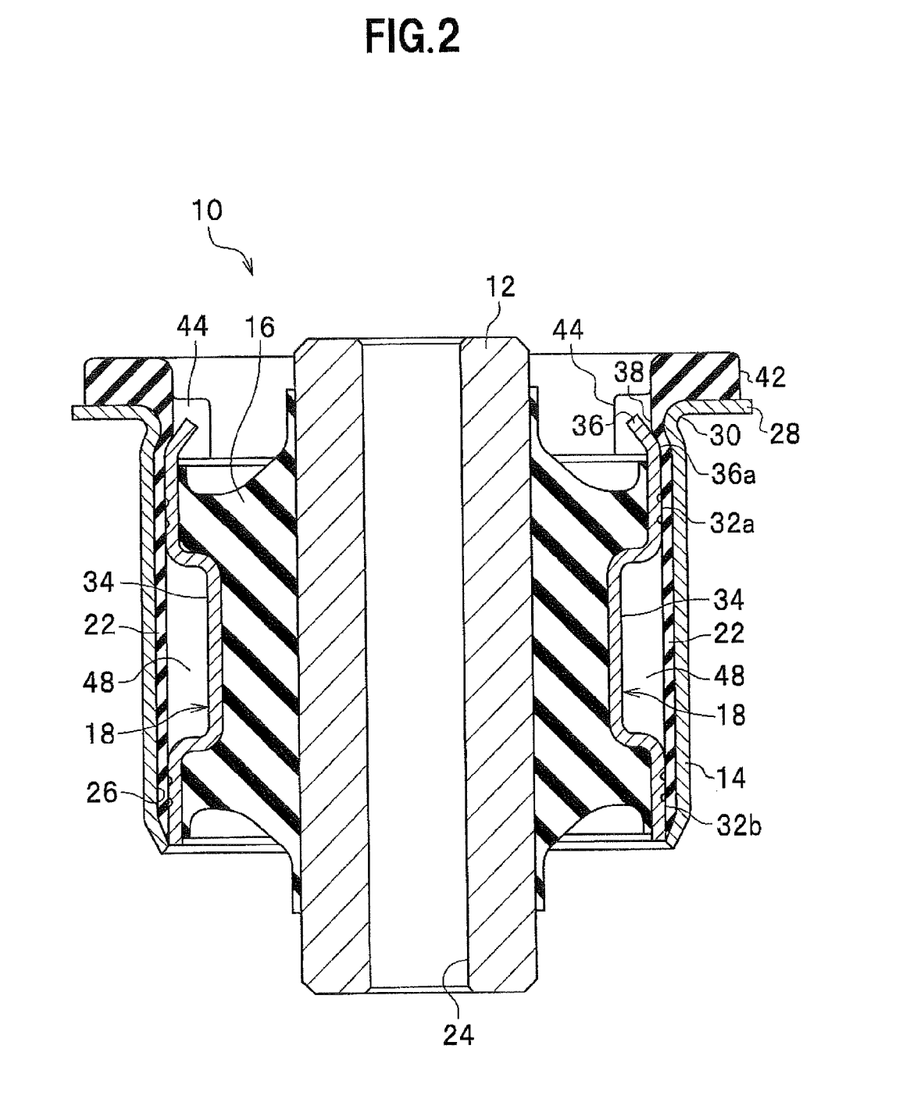
FIG. 2 is a cross sectional view, in an axial direction, of the liquid-sealed vibration damping or attenuation device according to the embodiment of the present invention.
Figure 3:
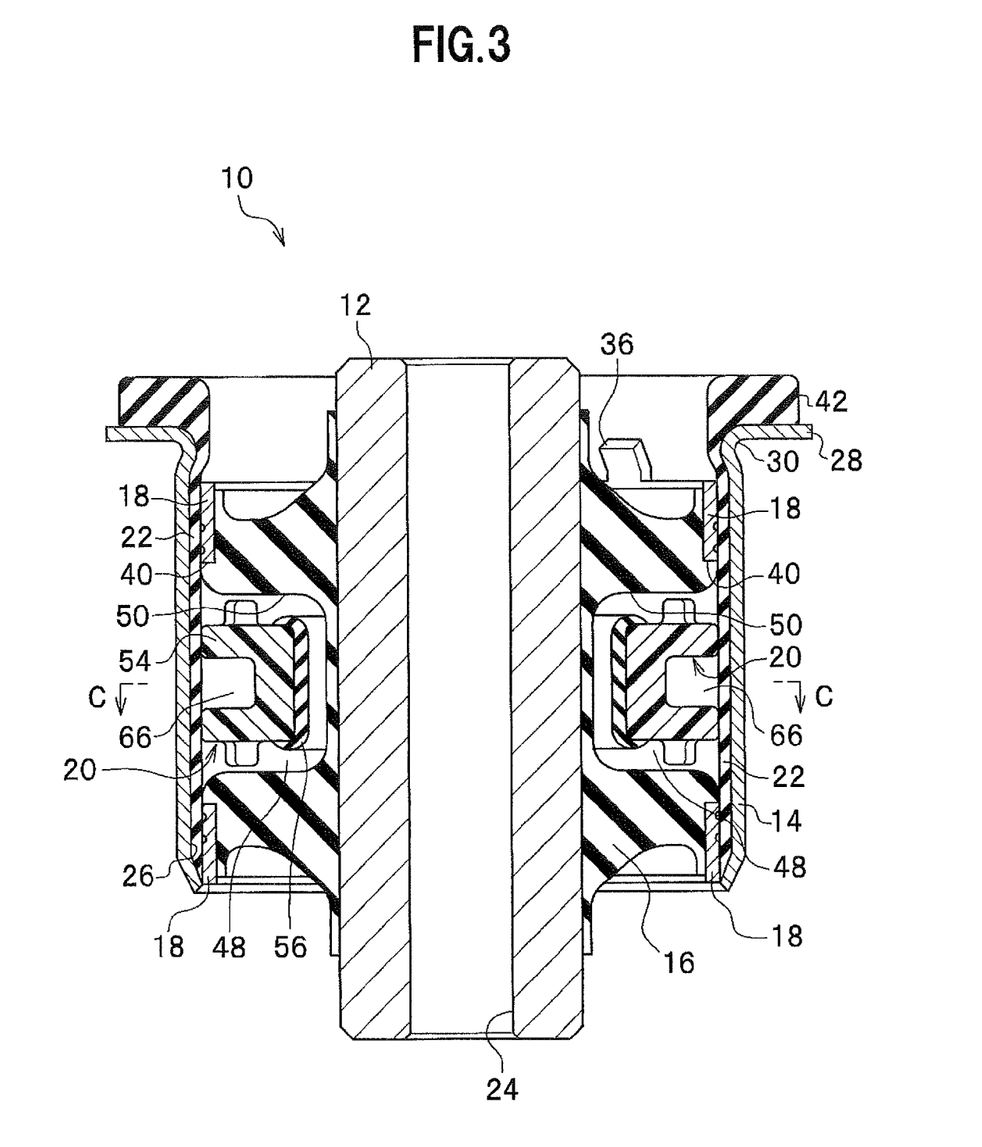
FIG. 3 is another cross sectional view, in the axial direction, of the liquid-sealed vibration damping or attenuation device according to the embodiment of the present invention.

As shown in FIGS. 2 and 3, the liquid-sealed vibration damping or attenuation device 10 is configured with an inner cylinder 12, an outer cylinder 14, a main rubber elastic body 16, an intermediate sleeve 18, a pair of orifice-forming members 20, 20 (see FIG. 3) and a seal rubber layer 22. It should be noted that, in the following description, a unit integrally assembled with the inner cylinder 12, the main rubber elastic body 16, the intermediate sleeve 18 and the pair of orifice-forming members 20, 20 may be referred to as an assembly at the inner cylinder side, and a unit formed with the outer cylinder 14 and the seal rubber layer 22 may be referred to as an assembly at the outer cylinder side. Also, the present embodiment is described with the pair of orifice-forming members 20, 20, but is not limited thereto, and, for example, a single orifice-forming member 20 may be used.

The inner cylinder 12 is a cylindrical body formed with a through hole 24 along an axial direction. An outer diameter dimension and an inner diameter dimension of the inner cylinder 12 are set constant from one end to the other end along the axial direction.

The outer cylinder 14 is arranged at an outer side of the inner cylinder 12. The outer cylinder 14 is a cylinder body that is formed with a through hole 26 along the axial direction and formed thinner than the inner cylinder 12. An outer flange 28 is formed at an upper end (end at one side in the axial direction) of the outer cylinder 14. The outer flange 28 is bent toward an outer direction substantially perpendicular to a central axis of the inner cylinder 12 so as to extend outward in the radial direction by predetermined length. The outer flange 28 is formed at an opening peripheral edge on the upper side (one side in the axial direction) of the outer cylinder 14.

At the bent portion (base portion) on an outer face side of the outer flange 28, an annular recess 30 having an arched cross section is formed around an entire circumference of the outer cylinder 14. The annular recess 30 is reduced in diameter toward the inner cylinder 12 side as compared with the other cylindrical portion of the outer cylinder 14. It should be noted that the dimension along the axial direction (length in the axial direction) of the outer cylinder 14 is formed shorter by predetermined length than that of the inner cylinder 12 (see FIGS. 2 and 3).

As shown in FIG. 2, the main rubber elastic body 16 is interposed between the inner cylinder 12 and the intermediate sleeve 18 to elastically couple the inner cylinder 12 with the intermediate sleeve 18. An inner circumferential face of the main rubber elastic body 16 is vulcanized to be bonded on an outer circumferential face of the inner cylinder 12, and an outer circumferential face of the main rubber elastic body 16 is vulcanized to be bonded on an inner circumferential face of the intermediate sleeve 18. The main rubber elastic body 16 is, for example, formed by injecting molten rubber between the inner cylinder 12 and the intermediate sleeve 18 that are set in a mold (not shown).

The intermediate sleeve 18 is arranged at a position spaced by a predetermined distance outward radially from the inner cylinder 12 and is coupled with the inner cylinder 12 via the main rubber elastic body 16. As shown in FIG. 2, the intermediate sleeve 18 includes: an upper ring part 32a; a lower ring part 32b; a pair of couplers 34, 34 that couple the upper ring part 32a with the lower ring part 32b; and a pair of inclined projection pieces 36, 36 that extend obliquely upward from an upper end face of the upper ring part 32a toward an upper end of the inner cylinder 12.

The upper ring part 32a and the lower ring part 32b are respectively formed in a continuous cylindrical shape seamlessly around an entire circumference of the inner circumferential face of the seal rubber layer 22, and, do not have a concave part nor a convex part in the direction perpendicular to the axis. Further, the upper end face of the upper ring part 32a is positioned below the minimum inner diameter portion in the annular recess 30 of the outer cylinder 14.

The upper ring part 32a and a lower ring part 32b are coupled by the pair of couplers 34, 34. The pair of couplers 34, 34 extend along the axial direction of the inner cylinder 12 to be arranged to oppose each other. A lower end face of the upper ring part 32a, an upper end face of the lower ring part 32b and side faces of the pair of couplers 34, 34 form a pair of windows 40, 40 in a rectangular shape opposing each other (see FIG. 3).

The sealing rubber layer 22 is continuously formed to have a thin wall along an inner circumferential face of the outer cylinder 14 and is vulcanized to be bonded thereto. It should be noted that the "sealing rubber layer" in the present embodiment refers to the thin rubber part that is interposed between an outer circumferential face of the intermediate sleeve 18 and the inner circumferential face of the outer cylinder 14 for sealing.

At an upper portion of the seal rubber layer 22, a retaining rubber 38 is arranged inside the annular recess 30 of the outer cylinder 14. The retaining rubber 38 is arranged to project inward further in the direction perpendicular to the axis than the seal rubber layer 22. Also, a stopper 42 formed to have a thick wall is arranged at an upper portion of the retaining rubber 38. The stopper 42 is arranged on a top face of the outer flange 28 around its entire circumference.

A pair of rotation-stop rubbers 44 are arranged inside the annular recess 30 of the outer cylinder 14 and an upper side of the seal rubber layer 22. The pair of rotation-stop rubbers 44 are arranged to clamp the inclined projection pieces 36, 36 in a circumferential direction of the intermediate sleeve 18. The pair of rotation-stop rubbers 44 of the present embodiment projects inward further in the direction perpendicular to the axis than the retaining rubber 38 (toward the inner cylinder 12) (see FIG. 2).

Figure 4:
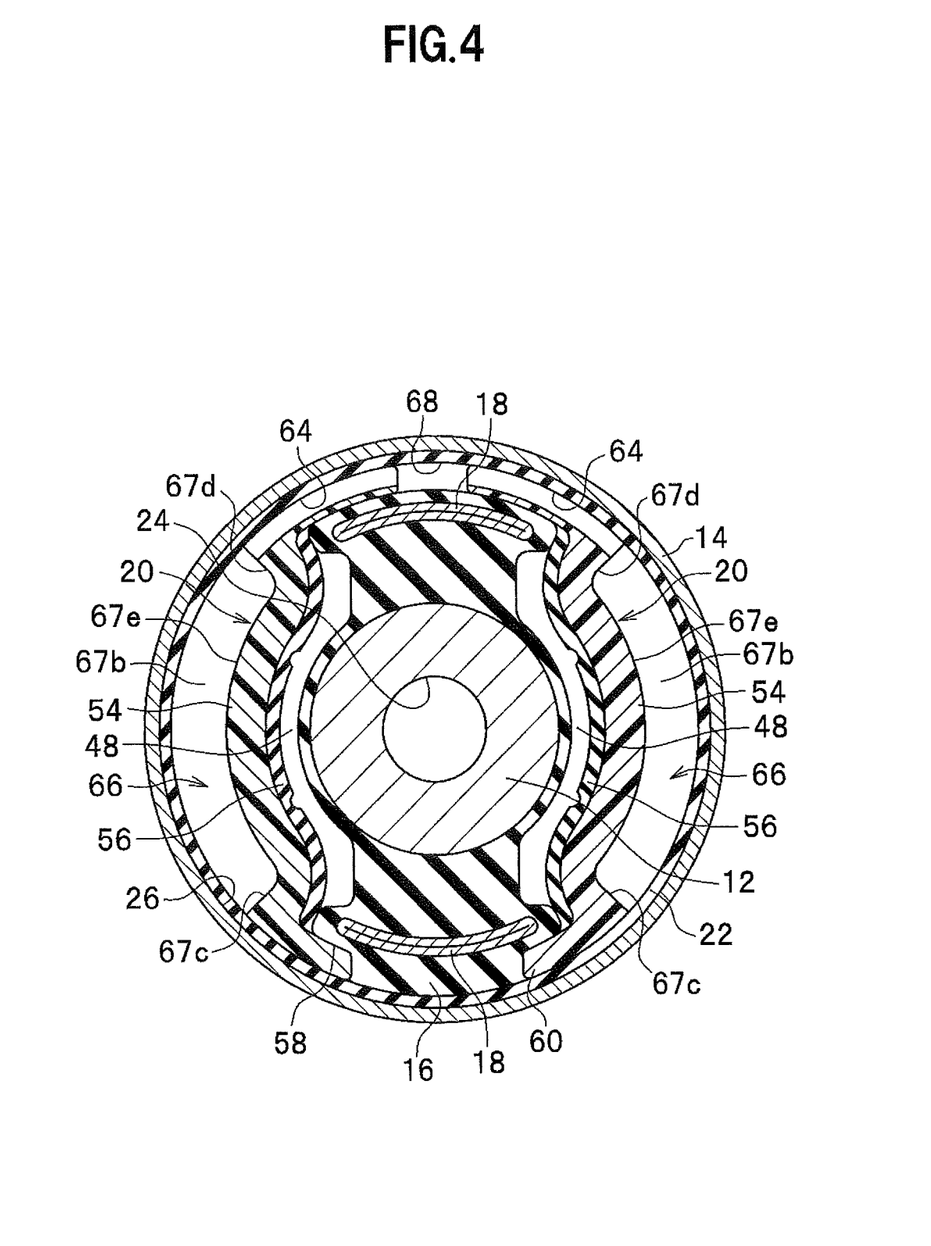
FIG. 4 is a cross sectional view in a direction perpendicular to the axis, taken along a C-C line in FIG. 3.

As shown in FIGS. 3 and 4, those provided between the inner cylinder 12 and the outer cylinder 14 are a pair of fluid chambers 48, 48, opposing each other, that are sealed by the main rubber elastic body 16 and the seal rubber layer 22. Incompressible fluid is sealed in the pair of fluid chambers 48, 48.

Those formed in the middle of the main rubber elastic body 16 in the axial direction are a pair of fitting recesses 50, 50 that extend along the circumferential direction to constitute a part of the fluid chambers 48. The pair of orifice-forming members 20, 20 are respectively installed in the pair of fitting recesses 50, 50.

Figure 5A:
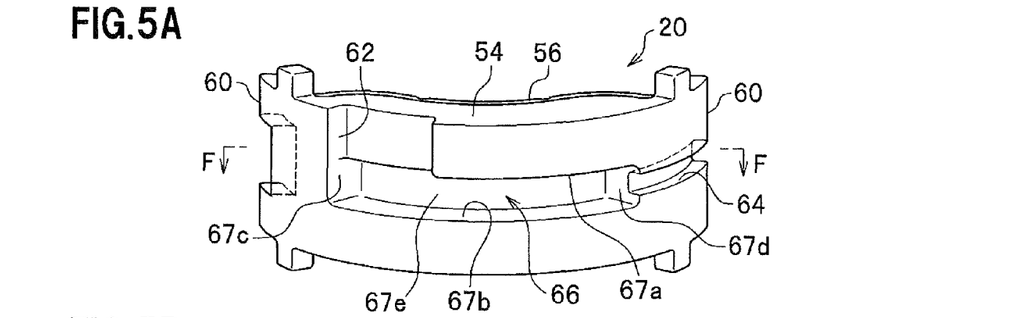
FIG. 5A is a perspective view of an orifice-forming member in the embodiment of the present invention.
Figure 5B:
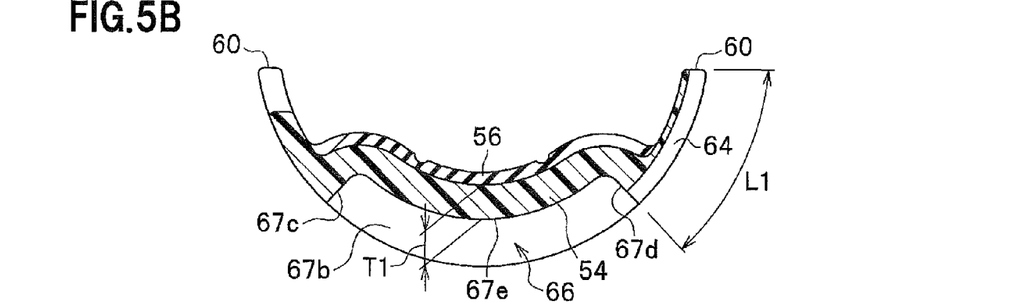
FIG. 5B is a lateral cross sectional view taken along an F-F line in FIG. 5A.

The pair of orifice-forming members 20, 20 are formed of resin material in the same shape, respectively. As shown in FIGS. 5A and 5B, each orifice-forming member 20 includes a main body 54 having a substantially semicircular shape in planar view, and a stopper rubber 56 fixed to an inner wall of the main body 54. At both ends of the main body 54, engaging projections 60 are formed to engage with engaging recesses 58 (see FIG. 4) that are formed in the main rubber elastic body 16.

As shown in FIGS. 5A and 5B, those formed on an outer circumferential face of the main body 54 area longitudinal groove (opening) 62 extending in parallel to the axial direction of the inner cylinder 12, an orifice channel 64 that is formed as a narrow and shallow groove to extend along the circumferential direction, and a liquid storage section 66 through which the longitudinal groove 62 communicates with the orifice channel 64. The liquid storage section 66 is formed to have a wider and deeper groove than that of the orifice channel 64. Since the liquid storage section 66 is designed to have a flow area larger than that of the orifice channel 64, the liquid storage section 66 does not function as an orifice.

As shown in FIG. 5A, the liquid storage section 66 is formed as a recess that is concave toward the inner cylinder 12. The recess includes lateral walls 67a, 67b that are arranged to face with each other in the up-down direction along the axial direction of the inner cylinder 12, one longitudinal wall 67c that continues to a lower portion of the longitudinal groove 62, the other longitudinal wall 67d that continues to the orifice channel 64, and a bottom wall 67e that is formed by the outer circumferential face of the main body 54. The lateral walls 67a, 67b extend in the direction perpendicular to the axial direction of the inner cylinder 12. The bottom wall 67e of the recess is formed to have a lateral cross section of an arc face. Forming the bottom wall 67e of the recess to have the arc face can reduce the orifice-forming member 20 in weight as well as can facilitate manufacturing the same.

The longitudinal groove 62 is open to a portion of the lateral wall 67a of the liquid storage section 66 and is formed shallower than the liquid storage section 66. The longitudinal groove 62 and the liquid storage section 66 are formed to communicate in the axial direction of the inner cylinder 12. Further, at a boundary between the liquid storage section 66 and the orifice channel 64, an end face of the orifice channel 64 is open to the other longitudinal wall 67d of the liquid storage section 66. The liquid storage section 66 and the orifice channel 64 are formed to communicate in the circumferential direction of the main body 54.

One fluid chamber 48 and the other fluid chamber 48 communicate via the pair of orifice-forming members 20, 20 and a communication channel 68 formed in the main rubber elastic body 16 (see FIG. 4). That is, one orifice-forming member 20 and the other orifice-forming member 20 are installed such that the respective orifice channels 64, 64 communicate with each other via the communication channel 68.

In more detail, one orifice-forming member 20 communicates with one fluid chamber 48 via the longitudinal groove 62 (see FIGS. 5A and 5B), the liquid storage section 66 and one orifice channel 64. While, the other orifice-forming member 20 communicates with the other fluid chamber 48 via one orifice channel 64, the communication channel 68, the other orifice channel 64, the liquid storage section 66 and the longitudinal groove 62 (see FIGS. 5A and 5B). As a result, the incompressible fluid sealed in the pair of fluid chambers 48, 48 can flow between the pair of fluid chambers 48, 48 via the pair of orifice-forming members 20, 20.

The liquid-sealed vibration damping or attenuation device 10 according to the present embodiment is basically configured as described above. Next, its functions and effects will be described.

When vibration (a load) is applied in the direction perpendicular to the axis to the liquid-sealed vibration damping or attenuation device 10 via the lower arm 2 from the tire 4, the main rubber elastic body 16 is elastically deformed. This elastic deformation causes pressure difference (fluid pressure difference) between one fluid chamber 48 and the other fluid chamber 48, to flow the incompressible fluid between one fluid chamber 48 and the other fluid chamber 48 via the orifice channel 64. Resonance effect is caused when the incompressible fluid flows in the orifice channel 64, and vibration prevention effect is exerted due to the resonance effect. In other words, damping effect is caused by the incompressible fluid flowing through the orifice channel 64, thereby absorbing the vibration. At the same time, vibration prevention effect is caused due to a spring property by the main rubber elastic body 16. Vibration prevention effect can be gained from the synergy of the spring property and the resonance effect.

Next, functions of the liquid storage section 66 will be described.

Figure 6A:
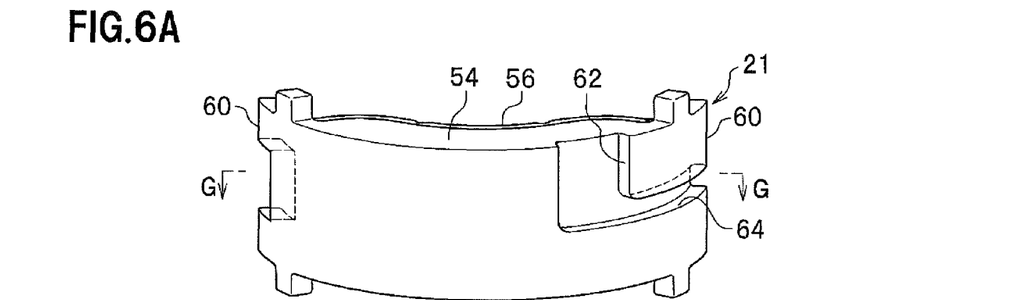
FIG. 6A is a perspective view of the orifice-forming member in a comparative example.
Figure 6B:
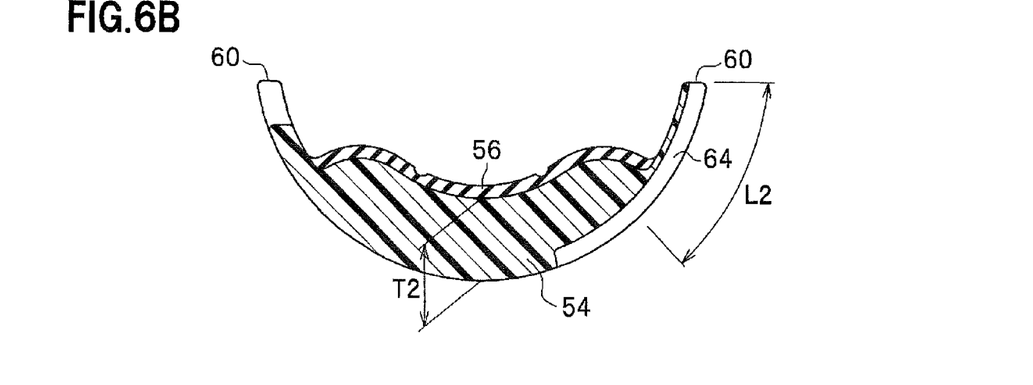
FIG. 6B is a lateral cross sectional view taken along a G-G line in FIG. 6A.

FIG. 5A is a perspective view of the orifice-forming member in the present embodiment, FIG. 5B is a lateral cross sectional view taken along an F-F line in FIG. 5A, FIG. 6A is a perspective view of the orifice-forming member in a comparative example, and FIG. 6B is a lateral cross sectional view taken along a G-G line in FIG. 6A. It should be noted that an orifice-forming member 21 in the comparative example is different from the orifice-forming member 20 in the present embodiment on a point that the orifice-forming member 21 does not have the liquid storage section 66. Other like components are marked with the same reference numerals.

In general, the resonance property by the incompressible fluid flowing through the orifice channel 64 is set, for example, by an orifice channel length. If an orifice channel length L1 of the orifice-forming member 20 in the present embodiment is designed to be equal to an orifice channel length L2 of the orifice-forming member 21 in the comparative example (L1=L2), the resonance property can be set to be equal.

In the orifice-forming member 20 in the present embodiment, the orifice channel length L1 is designed to be equal to the orifice channel length L2 in the comparative example, to allow for maintaining the resonance property so as to be the same as that of the comparative example. However, the liquid storage section 66 is formed between the longitudinal groove 62 and the orifice channel 64, to allow for reducing the orifice-forming member 20 in weight. That is, the orifice-forming member 20 can be reduced in weight by volume of the liquid storage section 66 without changing the resonance property.

In addition, in the orifice-forming member 20 in the present embodiment, a thickness T1 of the orifice-forming member 20 at the liquid storage section 66 can be thinner than a thickness T2 of the orifice-forming member 21 in the comparative example by forming the liquid storage section 66 between the longitudinal groove 62 and the orifice channel 64 (T1<T2). When the orifice-forming member 20 is molded to be thin with resin material, voids can be reduced, thereby improving moldability.

In the liquid-sealed vibration damping or attenuation device 10 of the present embodiment, the liquid storage section 66 is formed between the longitudinal groove 62 and the orifice channel 64 while the orifice channel length and the resonance property are maintained the same as those of the conventional orifice-forming member. That allows the orifice-forming member 20 to be reduced in weight. In other words, reducing material of the orifice-forming member 20 by the volume of the liquid storage section 66, allows for reducing the orifice-forming member 20 in weight as compared with the conventional orifice-forming member.

Further, the liquid storage section 66 includes the bottom wall 67e of the recess formed by the outer circumferential face of the inner cylinder 12. When the bottom wall 67e of the recess is formed to have an arc face, the orifice-forming member 20 can be reduced in weight and can be produced easily.

Figure 7A:
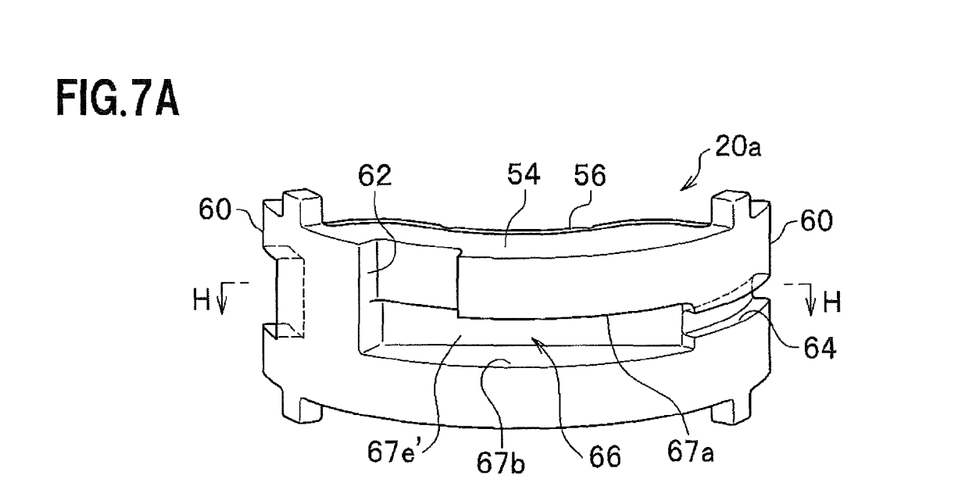
FIG. 7A is a perspective view of the orifice-forming member according to a first modification of the present invention.
Figure 7B:
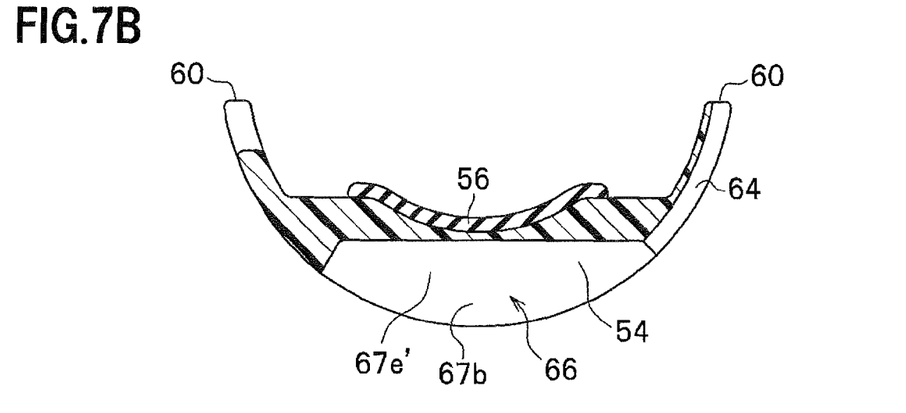
FIG. 7B is a lateral cross sectional view taken along an H-H line in FIG. 7A.

Next, a modification of an orifice-forming member 20a will be described. FIG. 7A is a perspective view of the orifice-forming member according to a first modification and FIG. 7B is a lateral cross sectional view taken along an H-H line in FIG. 7A. It should be noted that, in the modifications described below, like components as those in the orifice-forming member 20 shown in FIGS. 5A and 5B are marked with the same reference numerals, and detailed descriptions thereof will be omitted.

The orifice-forming member 20a according to the first modification is different from the orifice-forming member 20 (see FIGS. 5A and 5B) on a point that the former has a bottom wall 67e' of the recess formed to be a flat face by the outer face of the main body 54 is provided. Since the bottom wall 67e' of the recess of the orifice-forming member 20a is formed to be a flat face, the orifice-forming member 20a can be further reduced in weight and can be produced easily.

The embodiments shown in FIGS. 1 to 7 exemplify cases where the longitudinal groove 62, the liquid storage section 66 and the orifice channel 64 are arranged in series (the longitudinal groove 62 communicates with the orifice channel 64 via the liquid storage section 66). Next, embodiments in which those portions are not arranged in series will be described with reference to FIGS. 8A to 9B.

Figure 8A:
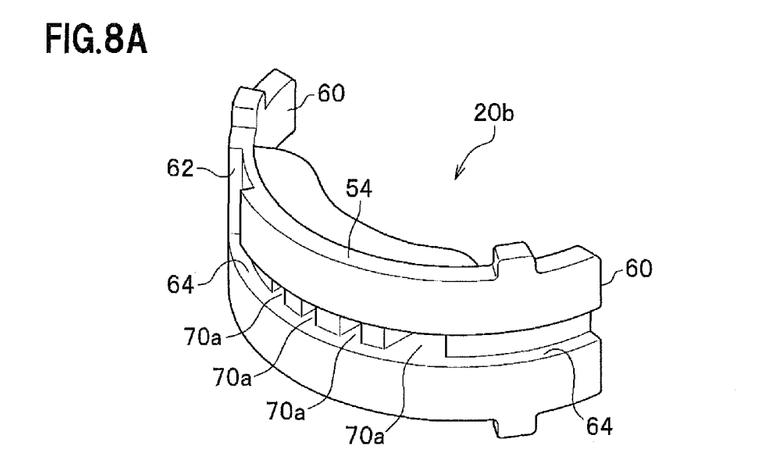
FIG. 8A is a perspective view of the orifice-forming member according to a second modification of the present invention.
Figure 8B:
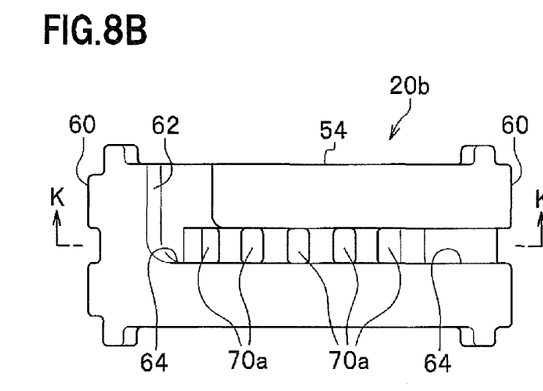
FIG. 8B is a front view of the orifice-forming member shown in FIG. 8A.
Figure 8C:
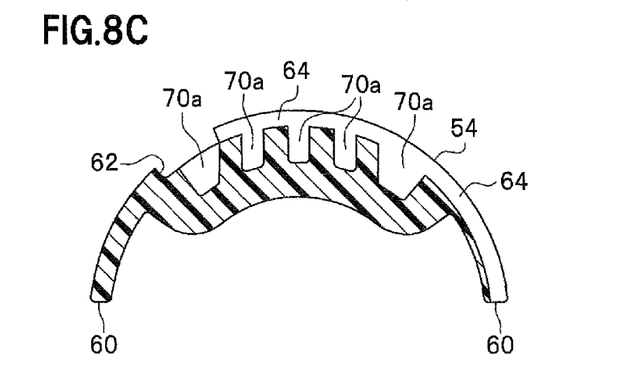
FIG. 8C is a lateral cross sectional view taken along a K-K line in FIG. 8B.
Figure 8D:
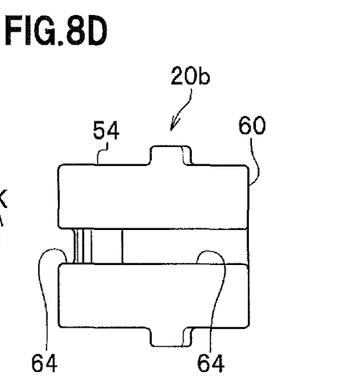
FIG. 8D is a side view of the orifice-forming member shown in FIG. 8A.
Figure 9A:
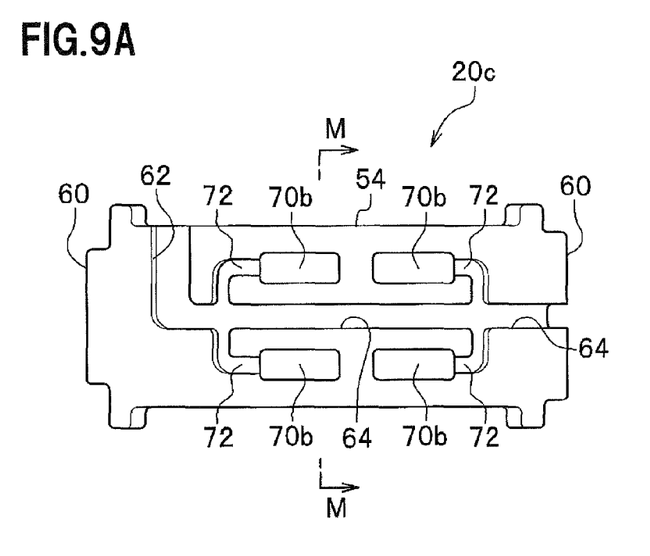
FIG. 9A is a front view of the orifice-forming member according to a third modification of the present invention.
Figure 9B:
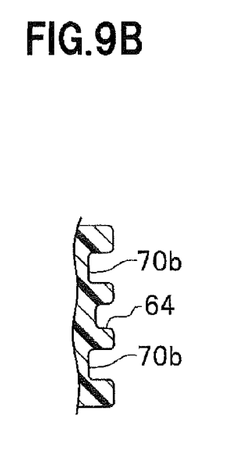
FIG. 9B is a longitudinal cross sectional view in part taken along an M-M line in FIG. 9A.

FIG. 8A is a perspective view of the orifice-forming member according to a second modification of the present invention, FIG. 8B is a front view of the orifice-forming member shown in FIG. 8A, FIG. 8C is a lateral cross sectional view taken along a K-K line in FIG. 8B, FIG. 8D is a side view of the orifice-forming member shown in FIG. 8A, FIG. 9A is a front view of the orifice-forming member according to a third modification of the present invention, and FIG. 9B is a longitudinal cross sectional view in part taken along an M-M line in FIG. 9A.

In an orifice-forming member 20b according to the second modification and an orifice-forming member 20c according to the third modification, the orifice channel 64 extends in an arc shape along the outer circumferential faces (outer side) of the main body 54 of the orifice-forming member 20b or 20c. One end of the orifice channel 64 is in direct communication with the longitudinal groove 62. Further, in the orifice-forming member 20b according to the second modification and the orifice-forming member 20c according to the third modification, the orifice channel 64 is formed to communicate with a recess (liquid storage section) 70a or 70b in the middle of the orifice channel 64. Thus, the orifice-forming member 20b according to the second modification and the orifice-forming member 20c according to the third modification are different from the orifice-forming member 20 (see FIGS. 5A and 5B) on a point that the longitudinal groove 62, the orifice channel 64, and the recess 70a or 70b are not arranged in series. In this way, the recess 70a or 70b that serves as a liquid storage section can be formed to communicate only with the orifice channel 64 and is not necessary to communicate with both of the longitudinal groove 62 and the orifice channel 64, thereby improving flexibility in layout. Moreover, since the incompressible fluid is introduced into the recess 70a or 70b via the orifice channel 64, the incompressible fluid can be stored easily.

As shown in FIGS. 8A to 8D, the orifice-forming member 20b according to the second modification includes a plurality of recesses 70a that are concave further toward the inner cylinder 12 from the bottom face of the orifice channel 64. The recesses 70a are positioned toward the inner side with respect to the bottom face of the orifice channel 64 to communicate with the orifice channel 64. The plurality of recesses 70a are formed at intervals in the longitudinal direction of the orifice channel 64 (flow direction of the incompressible fluid). Three recesses 70a at the center front have a rectangular shape in cross section, and the recesses 70a at both ends have a trapezoidal shape in cross section. With this structure, the incompressible fluid flowing through the orifice channel 64 can be easily introduced into the recesses 70a positioned at the inner side of the orifice channel 64. It should be noted that the number of recesses 70a is not limited to be plural but may be single.

As shown in FIGS. 9A and 9B, the orifice-forming member 20c according to the third modification includes a plurality of recesses 70b having a rectangular shape in front view. Two pairs of recesses 70b are arranged respectively along the axial direction of the inner cylinder 12 at an upper side (one side) and a lower side (other side) of the orifice channel 64. Further, substantially L-shaped communication channels 72 which allow the recesses 70b to communicate with the orifice channel 64 are formed between the orifice channel 64 and the respective recesses 70b. In this way, the recesses 70b can be arranged along the axial direction of the inner cylinder 12 in spaces at the upper and lower sides of the orifice channel 64. Thus, the spaces can be used effectively, and the orifice channel 64 can easily communicate with the recesses 70b via the communication channels 72.

It should be noted that, in the orifice-forming member 20c according to the third modification, the longitudinal groove 62, the orifice channel 64 and the communication channels 72 are designed to have the same depth. Further, a channel width of the communication channel 72 is designed to be narrower than that of the orifice channel 64. In the third modification, for example, when the orifice-forming member 20c is assembled integrally with the inner cylinder 12, the outer cylinder 14, the intermediate sleeve 18 and the like, the communication channels 72 communicating with the recesses 70b allow air remaining in the recesses 70b to be exhausted outside. As a result, the air remaining in the recesses 70b is suitably avoided from entering the fluid chambers 48. In addition, since other structures and effects in the first to third modifications are identical to those of the orifice-forming member 20 shown in FIGS. 5A and 5B, detailed descriptions thereof will be omitted.

DESCRIPTION OF REFERENCE NUMERALS 10 liquid-sealed vibration prevention device
12 inner cylinder
14 outer cylinder
16 main rubber elastic body
18 intermediate sleeve
20, 20a to 20c orifice-forming member
48 fluid chamber
62 longitudinal groove (opening)
64 orifice channel
66 liquid storage section
67e bottom wall
70a, 70b recess (liquid storage section)
72 communication channel

The invention claimed is:
1. A liquid-sealed vibration damping device comprising:
an inner cylinder;
an intermediate sleeve that is arranged at an outer side of the inner cylinder;
a main rubber elastic body that is interposed between the inner cylinder and the intermediate sleeve to elastically couple the inner cylinder with the intermediate sleeve; and
an outer cylinder that is arranged at an outer side of the intermediate sleeve,
wherein a pair of fluid chambers sealed with incompressible fluid and an orifice-forming member that allows one fluid chamber to communicate with another fluid chamber are arranged between the inner cylinder and the outer cylinder,
wherein the orifice-forming member includes an opening that communicates with respective fluid chambers, an orifice channel and a liquid storage section in which the incompressible fluid is stored, a liquid storage section does not function as an orifice, and
wherein the liquid storage section is formed deeper than the orifice channel, and wherein the liquid storage section has a larger flow area than the orifice channel, and wherein the liquid storage section does not extend for a full length of the orifice channel.

2. The liquid-sealed vibration damping device according to claim 1, wherein the liquid storage section is a channel that allows the opening to communicate with the orifice channel, and an opening width of the liquid storage section is formed to be wider than a channel width of the orifice channel.

3. The Liquid-sealed vibration damping device according to claim 2, wherein the orifice-forming member includes a pair of members and the pair of members are respectively formed to have the same shape.

4. The liquid-sealed vibration damping device according to claim 1, wherein the liquid storage section is a recess that is concave toward the inner cylinder, and a bottom wall of the recess is formed to have an arc face or a flat face.

5. The liquid-sealed vibration damping device according to claim 4, wherein the liquid storage section includes a single recess or a plurality of recesses that is/are concave toward the inner cylinder, and
the recess/recesses is/are positioned toward the inner side with respect to the orifice channel.

6. The Liquid-sealed vibration damping device according to claim 5, wherein the orifice-forming member includes a pair of members and the pair of members are respectively formed to have the same shape.

7. The liquid-sealed vibration damping device according to claim 4, wherein the liquid storage section are formed by a plurality of recesses that are concave toward the inner cylinder side,
the recesses are arranged along an axial direction of the inner cylinder at one side and the other side of the orifice channel, and
communication channels are formed that allow the recesses to communicate with the orifice channel.

8. The Liquid-sealed vibration damping device according to claim 7, wherein the orifice-forming member includes a pair of members and the pair of members are respectively formed to have the same shape.

9. The Liquid-sealed vibration damping device according to claim 4, wherein the orifice-forming member includes a pair of members and the pair of members are respectively formed to have the same shape.

10. The liquid-sealed vibration damping device according to claim 1, wherein the orifice channel communicates with the opening and the liquid storage section.

11. The Liquid-sealed vibration damping device according to claim 10, wherein the orifice-forming member includes a pair of members and the pair of members are respectively formed to have the same shape.

12. The Liquid-sealed vibration damping device according to claim 1, wherein the orifice-forming member includes a pair of members and the pair of members are respectively formed to have the same shape.

* * * * *